No. 786,344. PATENTED APR. 4, 1905.
S. C. CAMPAIGNE.
BRICK TRIMMING TOOL.
APPLICATION FILED JAN. 11, 1905.
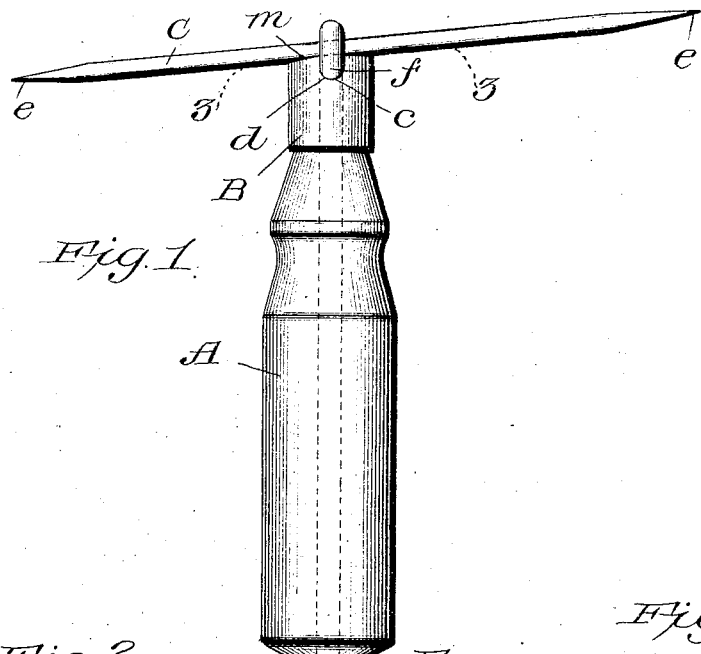
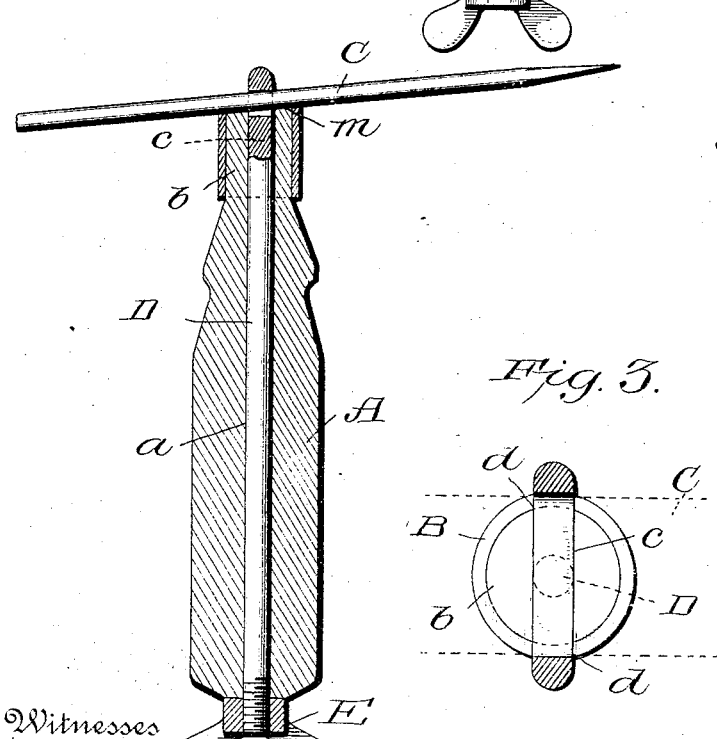
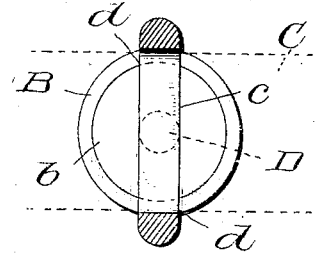
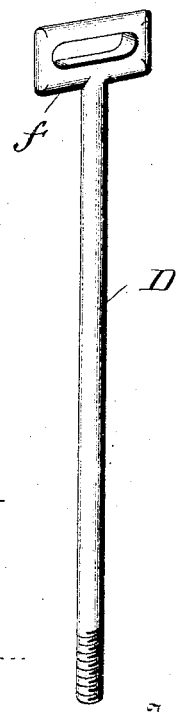
Witnesses
Inventor
S C Campaigne
by James J Sheehy
Attorney No. 786,344.

Patented April 4, 1905.

UNITED STATES PATENT OFFICE.

SAMUEL CHARLES CAMPAIGNE, OF NIAGARA FALLS, CANADA.

BRICK-TRIMMING TOOL.

SPECIFICATION forming part of Letters Patent No. 786,344, dated April 4, 1905.

Application filed January 11, 1905. Serial No. 240,664.

*To all whom it may concern:*

Be it known that I, SAMUEL CHARLES CAMPAIGNE, a citizen of Canada, residing at Niagara Falls, in the Province of Ontario and Dominion of Canada, have invented new and useful Improvements in Brick-Trimming Tools, of which the following is a specification.

My invention pertains to tools; and it has for its object to provide a "skutch" or tool for trimming brick embodying such a construction that its blade may be quickly and easily removed from its handle and as readily secured thereon, and one in which the blade is so positioned relative to the handle that the efficiency of the tool is materially increased.

With the foregoing in mind the invention will be fully understood from the following description and claims when taken in connection with the accompanying drawings, forming part of this specification, in which—

Figure 1 is a side elevation of the skutch or brick-trimming tool constituting the preferred embodiment of my invention. Fig. 2 is a longitudinal central section of the same. Fig. 3 is an enlarged horizontal section taken in the plane indicated by the line 3 3 of Fig. 1—*i. e.*, immediately below the blade of the tool; and Fig. 4 is a perspective view of the blade-holding bolt of the tool removed from the handle.

Similar letters designate corresponding parts in all of the views of the drawings, referring to which—

A is the handle of the tool, which is preferably, though not essentially, of wood. The said handle is provided with a longitudinal central bore $a$, which extends throughout its length, a reduced upper end $b$, and a diametrical kerf $c$ in said end.

B is a ferrule, preferably of brass, which is mounted on the upper end $b$ of the handle and has notches $d$ in its upper end registered with the kerf $c$.

C is the blade of the tool, which is designed to rest on the upper ends of the handle and ferrule and has both of its ends sharpened, as indicated by $e$.

D is the blade-connecting bolt, which occupies the bore $a$ of the handle and has a loop $f$ seated in the kerf $c$ and notches $d$ of the handle and ferrule, respectively, and receiving the blade, and also has its lower end extended beyond that of the handle and threaded, and E is a wing or other suitable nut mounted on the said threaded end of the bolt and turned up against the lower end of the handle A.

When the several parts of my novel tool are assembled and the nut E is turned up on the bolt D, the loop $f$ of the latter will be drawn down into the kerf $c$ and notches $d$, and hence will not only hold the blade C tight against the upper ends of the handle and ferrule, but will also securely hold the blade against turning on the ends of the handle and ferrule. When, however, the nut E is loosened and the loop of the bolt is raised out of the kerf $c$ and notches $d$, the blade may be quickly and easily removed from the loop to be sharpened or to give way to a new blade and may be as readily replaced in the loop and again fixed with respect to the handle. It will also be observed that in using the tool a bricklayer grasps the handle A, and hence there is no tendency to casually loosen the nut E, and thereby render the blade loose on the handle.

As will be noted by reference to Figs. 1 and 2 of the drawings, the upper ends of the handle A and ferrule B are beveled, as indicated by $m$, with the result that the blade B is positioned slightly out of a right angle to the handle A. This is advantageous, inasmuch as it increases the efficiency of the tool and enables a bricklayer to more quickly and easily trim a brick through the medium of the same.

I have specifically described the construction and relative arrangement of the parts included in the present embodiment of my invention in order to impart an exact understanding of said embodiment. I do not desire, however, to be understood as confining myself to the said specific construction and relative arrangement of parts; as such changes or modifications may be made in practice as fairly fall within the scope of my invention as claimed.

Having described my invention, what I claim, and desire to secure by Letters Patent, is—

1. A "skutch" or brick-trimming tool, comprising a handle having a bore extending throughout its length and a diametrical kerf in its forward end and also having its forward end beveled, a bolt occupying the bore of the handle and having a loop at its forward end disposed in the kerf of the handle, and also having its rear end threaded, a blade resting in the loop of the bolt and against the forward, beveled end of the handle, and a nut mounted on the rear end of the bolt and arranged to bear against the handle.

2. The herein-described "skutch" or brick-trimming tool comprising a handle having a longitudinal central bore extending throughout its length, a reduced forward portion, a beveled forward end and a diametrical kerf in said beveled end, a ferrule mounted on said forward portion of the handle and having a correspondingly-beveled forward end, and also having notches registered with the kerf, a blade resting against the beveled ends of the handle and ferrule, a bolt occupying the bore of the handle and having a loop at its forward end disposed in the kerf and notches and receiving the blade, and also having its rear end extended beyond that of the handle and threaded, and a nut mounted on said threaded end of the bolt and arranged to bear against the rear end of the handle.

In testimony whereof I have hereunto set my hand in presence of two subscribing witnesses.

SAMUEL CHARLES CAMPAIGNE.

Witnesses:
ALEXANDER FRASER,
CHAS. B. ALDRY.